United States Patent [19]

Burk

[11] Patent Number: 4,723,475

[45] Date of Patent: Feb. 9, 1988

[54] FULLY METERED COMPENSATION STEERING SYSTEM

[75] Inventor: Ronnie F. Burk, Waterloo, Iowa

[73] Assignee: Deere & Company, Moline, Ill.

[21] Appl. No.: 912,720

[22] Filed: Sep. 29, 1986

[51] Int. Cl.⁴ ............................................. F15B 13/14
[52] U.S. Cl. ...................................... 91/434; 180/152
[58] Field of Search ...................... 180/152, 153, 142; 91/375 R, 375 A, 434

[56] References Cited

U.S. PATENT DOCUMENTS

| | | |
|---|---|---|
| 3,554,089 | 1/1971 | Lang . |
| 3,584,537 | 6/1971 | Schulz . |
| 3,657,888 | 4/1972 | Zirps . |
| 3,765,181 | 10/1973 | Lang et al. . |
| 3,865,211 | 2/1978 | Liebert et al. .................. 180/153 |
| 4,028,997 | 6/1977 | Lang . |
| 4,405,030 | 9/1983 | Wittren ........................ 180/152 X |
| 4,424,672 | 1/1984 | Kalhorn ....................... 180/152 X |
| 4,470,260 | 9/1984 | Miller et al. . |
| 4,512,238 | 4/1985 | Bacardit ......................... 91/434 X |
| 4,557,342 | 12/1985 | Drutchas ....................... 180/142 X |

Primary Examiner—Edward K. Look

[57] ABSTRACT

A power steering system for positioning the steerable wheels of a vehicle that provides increased handling feedback to the operator via the steering wheel. The system uses a motor driven pump and a bidirectional hand pump to supply and control fluid pressure for steering the wheels. Two pairs of servomotors steer the vehicle with a first pair receiving a regulating amount of fluid from the bidirectional hand pump and a second pair primarily receiving fluid pressure for moving the steerable wheels from the motor driven pump. In order to increase read ability during selected steering manuevers and change the steering ratio, a compensating valve decreases fluid pressure from the power pump to the second pair of servomotors in response to an operator controlled condition such as turning angle or vehicle speed. The system can also be arranged to have a maximum ratio which will facilitate steering in the absence of fluid pressure from the motor driven pump.

9 Claims, 1 Drawing Figure

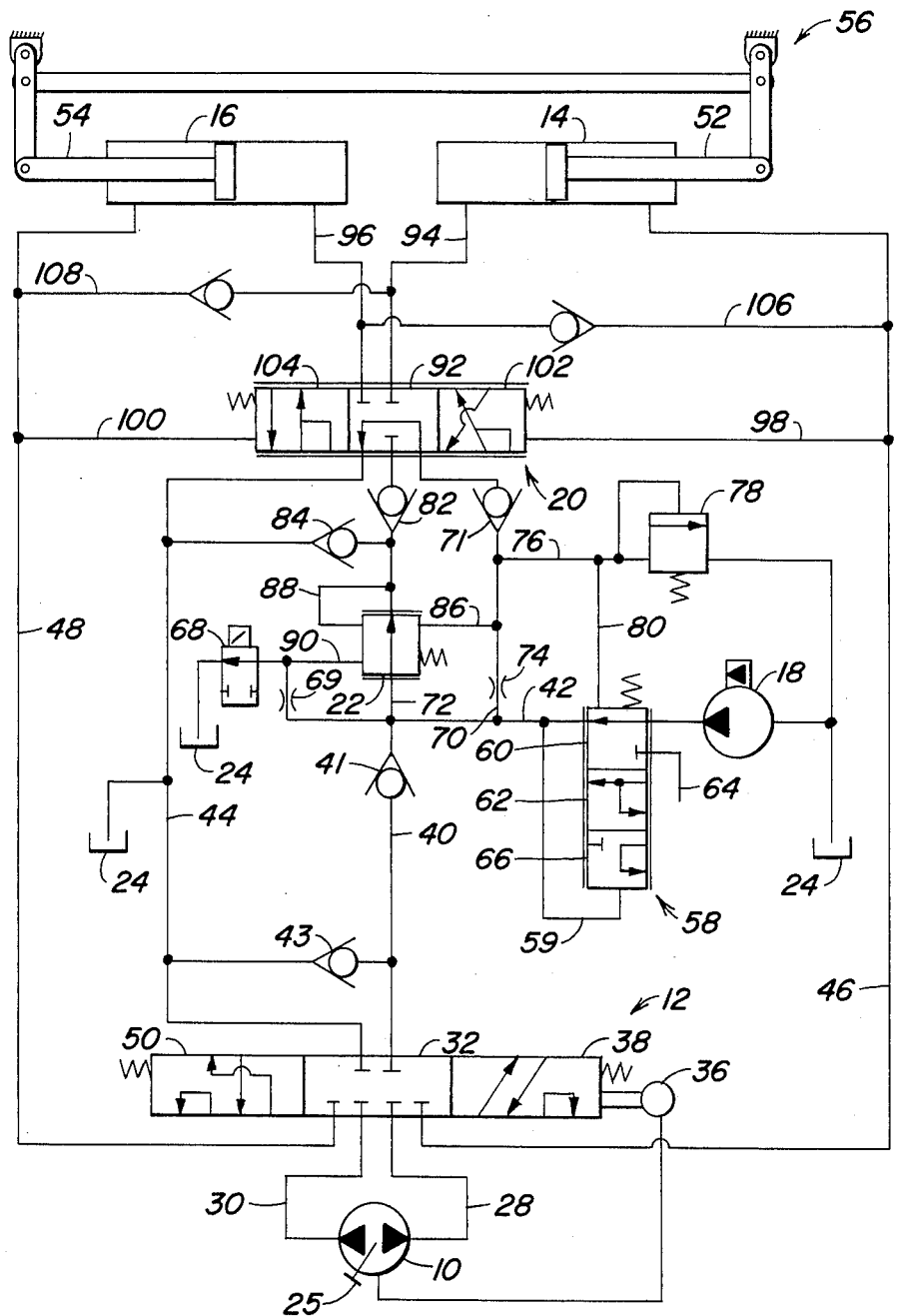

FULLY METERED COMPENSATION STEERING SYSTEM

BACKGROUND OF INVENTION

1. Field of Invention

This invention relates to a fully hydraulic power steering system, particularly suited for large vehicles. This system is of the type using a power pump for normally supplying working fluid to a pair of steering motors and a manually operated metering pump for controlling positioning of the steering motors.

This invention also relates to steering systems having a variable ratio for allowing the operator to generate sufficient fluid pressure to control the steering system in the absence of fluidized pressure generated by the power pump.

2. Description of the Related Art

Power steering systems having a manually operated steering wheel for generating fluid pressure at a metering pump which in turn controls a power pump for actuating steering are well known. U.S. Pat. No. 3,584,537 shows a constant assist hydrostatic steering system wherein an operator controlled metering pump directs fluid to a secondary motor for metering movement of the steering system and controls fluid delivery from a motor driven hydraulic pump to a primary steering motor. Another dual servomotor system is shown in U.S. Pat. No. 3,657,888, wherein manually generated fluid pressure drives one servomotor and operates a first and second control valve for regulating power assist to a second servomotor. In U.S. Pat. Nos. 3,554,089 and 4,028,997 a metering pump of the gerotor type and one or more motor-driven power pumps deliver pressurized fluid to a hydraulic steering system, wherein a first control valve regulates delivery of metered fluid flow to a first servomotor as well as delivery of power fluid to the intake of the gerotor while a second control valve arrangement responsive to pressure differential across the first servomotor regulates delivery of power fluid to a second servomotor. U.S. Pat. No. 3,765,181 expands the teachings of U.S. Pat. No. 3,554,089 to incorporate means in the second control valve arrangement for delivering pressurized fluid from the gerotor to the second servomotor in the event of failure of the power pump in order to achieve a change in ratio which will allow the operator to control the steering system without power assistance. Thus, the prior art has shown how to combine the convenience and comfort of a power assist steering system with the improved control of a full flow metering type system. Such systems also provide for dual steering ratios through dual servomotors which will allow the operator to control this steering during emergencies when power assist is not available.

While the metering systems of the prior art can provide accuracy and ease of operation, it is also desirable to have the steering system sensitive to variable operating conditions of the vehicle. For example, a greater degree of steering control is necessary when the operator is making small adjustments in vehicle direction or the vehicle is traveling at high speed. The need for such adjustments, usually occurs when the vehicle is traveling in a straight ahead direction. In the case of industrial or agricultural vehicles, precise straight ahead control greatly benefits its operation. It is known that a greater degree of steering control can be obtained by increasing the turning resistance at the steering wheel of a vehicle. This selected increase of turning resistance facilitates operator control without sacrificing operator comfort.

SUMMARY OF THE INVENTION

Accordingly, it is an object of this invention to provide a variable ratio steering system.

It is also an object of this invention to provide a hydraulic steering system having a fully metered turning motion with a variable turning resistance offering more precise control.

A further object of this invention is to provide a power assisted and metered hydraulic steering system which will increase the resistance of the steering system for the operator during predetermined operating conditions of the vehicle.

A yet further object of this invention is to provide a power assisted and metered steering system having a high steering ratio and low sensitivity for making minor steering corrections and a low ratio with high sensitivity for major steering corrections.

Another object of this invention is to provide a change in steering ratio for a power assisted, fully metered hydraulic steering system which allows the operator to control the vehicle in the absence of power assistance.

In brief summary, the power steering system of this invention includes a motor driven pump, a bi-directional metering pump or gerotor and a servomotor assembly having two pairs of expanding and contracting chambers and providing mechanical input to a steerable element. A first control valve having a neutral position and two operative positions, each associated with turning the vehicle in an opposite direction, directs fluid output from the metering pump. In each operative position, the control valve directs fluid pressure or power fluid from the power pump to the metering pump and from the metering pump to an expanding chamber of a first servomotor chamber pair. Fluid pressure regulated by the metering pump actuates a second control valve. Fluid pressure moves the control valve from a neutral position, blocking fluid flow into or out of the second servomotor chamber pair, to one of two operative positions associated with opposite turning directions of the vehicle. Either operative position communicates power fluid from the power pump to an expanding chamber in the second servomotor chamber pair. In order to increase the turning resistance at the metering pump, a compensating valve reduces the supply of pressurized fluid to the second control valve. By reducing pressure supply to the second valve, the operator must exert more effort on the metering pump in order to maintain a pressure differential across the pump and initiate or sustain a turning manuver. The compensating valve responds to a compensator signal, generated in proportion to one or more monitored operating parameters of the vehicle, such as vehicle speed, steering assembly position, or rate of steering wheel motion.

The compensator valve progressively diverts fluid flow from the power circuit to the control circuit so that the net result is at first an increase in resistance at the hand wheel and finally an increase in the number of hand wheel turns required to move the steering actuator through a given range of motion.

Advantageously, incorporation of a compensating valve can be accomplished with little additional complexity or added cost to the system. In another embodiment, control of the signal to the compensating valve can be operator tuned to a desired amount of turning resistance.

Other objects, embodiments and advantages of this invention will become apparent from the detailed description that follows.

BRIEF DESCRIPTION OF THE DRAWING

The figure is a schematic representation of the steering system of this invention.

DETAILED DESCRIPTION OF THE PREFERRED EMBODIMENT

The steering system is arranged in a vehicle and consists of two parallel circuits depicted schematically in the figure. One circuit is a control circuit having as primary components a manually operated metering pump or gerotor 10, a metering valve 12 and the rod ends of a pair of actuators 14 and 16. The other circuit comprises a power circuit, including as primary components, a power pump 18, a power valve 20, the piston ends of actuators 14 and 16, and a compensator valve 22. Both circuits share a common reservoir 24 and communicate in a manner hereinafter described.

Looking first at the control circuit, gerotor 10 is a full flow metering pump of the gerotor type coupled to a vehicle steering wheel 25. Gerotor 10 is sized to match, the lesser of, the power an operator can generate or the reserve steering power requirements of the vehicle as explained later. Gerotor 10 communicates fluid, in a direction determined by the operator's rotation of steering wheel 25, across metering valve 12 via passages 28 and 30 ,respectively. Operator input to gerotor 10 also controls positioning of metering valve 12 in a manner well known to those skilled in the art via an actuator assembly 36 that monitors the rotational direction of steering wheel 25 or the direction of fluid flow through gerotor 10.

Metering valve 12 is a 6-way (port) three-position valve. A passage 40 supplies pressurized fluid from power pump 18 to valve 12 through an intermediate passage 42. Another passage 44 communicates valve 12 with reservoir 24. A check valve and passage 43 permits fluid flow from passage 44 to passage 40. Another check valve 41, positioned along passage 40 between passages 42 and 43 blocks fluid flow in the direction of passage 42 to the power pump. Valve 12 has a schematically illustrated spool section which is spring biased to a center position 32 for blocking fluid flow across the valve. Responsive to rotation of the steering wheel 25 in a direction pressurizing passage 28, an actuator assembly 36 shifts the spool leftward to an operative position 38. In operative position 38, pressurized fluid from passage 40 is communicated to passage 30, while regulated fluid flow from passage 28 is directed to the rod side of actuator 14 through a metering passage 46. Spool position 38 also communicates the rod end of actuator 16 with passage 44 through another metering passage 48. Rotating steering wheel 25 in the opposite direction shifts the spool of valve 12 rightward into an operative position 50 communicating pressurized fluid from passage 40 to passage 28, so that regulated fluid flow from gerotor 10 and passage 30 is directed to passage 48 and actuator 16, while passage 46 communicates with reservoir 24 via passage 44. Fluid pressure from passage 46 and 48 urges cylinder rods 52 and 54, respectively, to retract into their respective actuators. A steering linkage 56 couples movement of cylinder rods 52 and 54 such that retraction of one rod accompanies extension of the other rod.

The piston ends of actuators 14 and 16 usually respond to fluid pressure from pump 18. Pump 18 is a unidirectional pressure compensated pump driven by the prime mover of the vehicle. Pump 18 draws fluid from reservoir 24 and delivers pressurized fluid to passage 42 across a priority valve 58.

Valve 58 is an infinitely variable three-way valve having a spool section with three schematically represented positions. A spring biases valve 58 to a first open position 60 establishing unrestricted fluid communication across passage 42. A pilot passage 59 communicates fluid pressure from passage 42 which acts to progressively urge the spool to a position 62, for dividing pump output between passage 42 and a secondary function passage 64, and a position 66, which directs all pump output to passage 64. Passage 64 supplies fluid pressure to a variety of secondary functions (not shown).

Fluid pressure in passage 42 is communicated: to metering valve 12 in a manner previously described; across an orifice 69 to a solenoid valve 68 having variable positioning; and to power valve 20 via a main supply passage 72. A check valve assembly 84 for communicating fluid pressure from passage 44 to passage 72, a check valve 82, and compensator valve 22 are arranged along passage 72 from power valve 20 to passage 42.

Passage 42 also communicates with a load sensing circuit through a connection with passage 70. An orifice 74 located near the connection of passage 42 restricts fluid flow across passage 70. The opposite end of passage 70 communicates with power valve 20 and has a check valve 71 located near its connection therewith to prevent back flow of fluid from valve 20 into the pilot circuit. Another passage 76 branches off of passage 70 between control valve 20 and orifice 74, and has a pilot relief valve 78 located thereacross for sumping excess fluid pressure to reservoir 24. Pilot relief valve 78 monitors pressure in passage 76 to primarily to prevent overpressurization of the load sensing circuit. Fluid pressure in passage 76 is communicated to priority valve 58 via a pilot passage 80 and acts to urge the spool to a position increasing fluid flow across passage 42.

Schematically illustrated compensator valve 22 has an infinite range of operating positions between a fully open and a fully closed condition. A spring biases the compensator valve to a open position. A pilot passage 86 communicates fluid pressure from a section of passage 70 between orifice 74 and valve 20, with the pressure urging compensator valve 22 to an open position.

A pair of passages 88 and 90 communicate fluid pressure to compensator valve 22 which acts to urge valve 22 to a closed position Passage 88 senses fluid pressure in passage 72 between the valve 22 and orifice 82 and together with passage 86 provides inlet compensation for valve 22 to maintain a constant pressure drop thereacross. Solenoid valve 68 supplies fluid pressure to passage 90 in proportional response to one or more operating parameters of the vehicle. Suitable parameters, include position of the steerable wheels, vehicle speed, or the rate of steering wheel movement. In this preferred embodiment, the vehicle speed is sensed by suitable electrical sensors (not shown) to generate a signal causing solenoid valve 68 to increase pressure in passage 90 as the vehicle speed increases. Opening of the valve 22 increases delivery of pressurized fluid to valve 20.

Power valve 20 is a five-way (five port) infinitely variable control valve having a schematically represented spool section movable between a neutral position and two operative positions. The spool of valve 20 is spring centered to a neutral position 92 that communicates fluid pressure to control valve 12 by connecting passages 70 and 44, while blocking fluid flow through compensating valve passagse 72, position 92 also blocks a pair of actuator passages 94 and 96 which communicate valve 20 with the piston ends of actuators 14 and 16 respectively. A pair of shift passages 98 and 100 communicates fluid pressure in passages 46 and 48, respectively, to opposite sides of valve 20 to shift the spool right or left in response to a sufficiently high pressure differential. When shifted leftward, spool section 102 communicates fluid pressure from passages 70 and 72 to the piston end of actuator 16 and sumps fluid pressure from the piston end of actuator 14 to reservoir 24 via passages 44 and 94. Rightward shifting of the spool allows spool section 104 to reverse the communication and sumping of fluid pressure with respect to the piston ends of actuators 14 and 16.

In addition to receiving fluid pressure from power pump 18 as previously described, the piston ends of actuators 14 and 16 can also receive fluid pressure from the gerotor 10 via metering passages 48 and 46, respectively. For this purpose, a pair of check assembly passages 106 and 108, each having a check valve positioned thereacross, communicate fluid pressure from the appropriate metering passage to passages 96 and 94, respectively.

Operation

Operation of the steering system configuration is described in the context of performing a turning maneuver as the vehicle speed increases. The cycle maneuver begins with the vehicle moving at slow speed and rods 52 and 54 centered midway between full extension and full retraction. This rod position steers the vehicle for straight-ahead movement.

With the vehicle in operation and priority valve 58 in position 60, pump 18 supplies fluid pressure to priority valve 58 which is bled to reservoir 24 via passages 42, 70 and 44. Resistance through orifice 74 increases pressure in passage 42 which is sensed by pilot passage 59 and acts to modulate valve 58 between positions 66 and 62 so that fluid pressure is communicated to secondary functions via passage 64.

In order to initiate turning, the operator rotates steering wheel 25 clockwise. In response to clockwise wheel movement, actuator assembly 36 moves the spool of valve 12 into operative position 38 into so that fluid pressure generated by gerotor 10 acts at the rod end of actuator 14 to urge retraction of rod 52 and extension of rod 54. Spool position 38 also sumps the rod end of actuator 16 to reservoir 24. Communication and sumping of fluid pressure creates a pressure differential between passage 46 and 48 which, upon reaching a sufficient magnitude, shifts the spool of valve 20 leftward into position 102 to sump fluid from the piston end of actuator 14, through passages 94 & 44. Relieving fluid pressure on the piston end of actuator 14 allows both rods to be driven leftward by gerotor generated pressure in actuator 14 and power pump pressure in actuator 16. The check valve in check assembly passage 106 prevents power fluid pressure generated by pump 18 from entering the rod end of actuator 14 so that all rod motion is fully metered by gerotor 10.

When steering is initiated at a slow speed, solenoid valve 68 opens to minimize fluid pressure in passage 90, which moves compensator valve 22 to a fully open position. Prior to shifting valve 20 from a neutral condition, fluid pressure in passage 88 acting to close valve 22 is counteracted by an equal fluid pressure from passage 86. With valve 22 biased toward an open position, the gain across valve 20 is high, so that valve 20 needs only a small flow area to supply adequate power fluid to passage 96. Producing small flow area requires little displacement of valve 20. Therefore, the necessary pressure drop between passage 46 and 48 is relatively low and can be maintained with little torque on wheel 25. Thus, the operator experiences little effort in turning the vehicle as long as the vehicle is steered at low vehicle speed. In this way, the pressure supplied by valve 22 affects the gain of valve 20 and ultimately the steering effort required at wheel 25.

Continued clockwise rotation of the steering wheel increases the degree of the turn away from a substantially straight ahead steering condition. Increased vehicle speed during such a maneuver causes solenoid 68 to move toward a closed position thereby increasing pressure in passage 90. Raising pressure in passage 90 urges valve 22 away from a fully open position which decreases the supply of pressurized fluid to valve 20. This in turn lowers the gain of valve 20 for a given pressure drop across passages 48 and 46. Therefore, to maintain the same turning rate at a higher speed, valve 20 must be displaced further to increase its flow area and maintain the same flow rate to passage 96. Further displacement of valve 20 demands greater torque at wheel 25 to generate a higher pressure drop across passages 48 and 46.

As vehicle velocity continues to increase during the same turning maneuvers, valve 22 is urged further into a closed position. At some point, as valve 22 approaches a fully closed position, the pressure developed in passage 46 will equal the pressure in passage 96. When the happens, passage 106 communicates fluid pressure from passage 46 to passage 96 and increases the required number of turns at wheel 25 to perform a given turning maneuver, the end result being a change in ratio for the steering system.

Once the vehicle velocity has increased to the point of communicating fluid pressure across passage 106, additional velocity further increases the turning ratio. For a constant turning rate, the turning ratio can increase with vehicle velocity until valve 22 is moved to a fully closed position. When valve 22 closes, the only fluid flow from pump 18 to passage 96 is across the restricted flow path of passage 70.

In order to bring the cylinders from a left to a right position, the operator turns the steering wheel counterclockwise to shift the spool of valve 12 rightward into position 50 and ultimately generate fluid pressure at the rod end of actuator 16. In a manner analogous to that previously described, fluid pressure from the gerotor and the sumping of passage 46 shifts the spool of valve 20 rightward into position 104 so that rods 54 and 52 are driven to the right by fluid pressure in the piston end of actuator 14 at a rate permitted by the metering of fluid into actuator 16.

During turning maneuvers, priority valve 58 subordinates the fluid demands of secondary functions, supplied via passage 64, to the fluid pressure requirements of the steering system. Additional details on priority systems and various arrangements of priority systems may be obtained from U.S. Pat. No. 4,470,260 and the references cited therein. The priority valve 58 of this steering arrangement senses the pressure drop across orifice 74 as fluid flows from pump 18 to either of the actuators. When the actuator rods move freely at a moderate rate of travel, a moderate pressure drop exists between passages 72 and 76 so that pressure from passage 59 modulates the valve spool primarily in position 62, thereby supplying fluid pressure to the secondary functions. As the actuator rods encounter resistance, fluid pressure rises downstream of orifice 74. Passage 80 senses the increased pressure and urges the valve spool toward position 60, which will direct more fluid pressure to the steering system. The supply of fluid pressure to the steering system will increase until a stall condition is encountered. If the steering system stalls, i.e., if obstruction of the vehicle wheels unduly inhibits movement of rods 54 and 52, the corresponding high pressure condition opens relief valve 78. Relief valve 78 establishes fluid flow from pump 18 to reservoir 24 and limits pressure downstream of orifice 74. Lower pressure downstream of the orifice allows valve 58 to resume pressure supply to the secondary functions by dissipating the biasing force associated with passage 80. Consequently, fluid flow to the secondary circuit is maintained during the stall condition since the steering system cannot be operated and throttling the secondary circuit pressure will not provide any benefit.

In order to demonstrate operation of the system when fluid pressure from pump 18 is not available, the operation of the system is described in returning rods 54 and 52 from a full right position to a centered position using only fluid pressure from gerotor 10. Turning is again initiated by the operator rotating the steering wheel clockwise which shifts the spool of valve 12 leftward to position 38 and transmits fluid pressure from the gerotor to the rod end of actuator 14. The pressure differential between passages 46 and 48 again shifts the spool of valve 20 into position 102. In the absence of fluid pressure from pump 18, fluid pressure from the gerotor 10 is communicated across check assembly passage 106 to the piston end of actuator 16. In this way, rods 54 and 52 are driven leftward by fluid pressure from the gerotor to provide a change in ratio for the steering system. Back flow of fluid pressure across valve 20 and through passages 72 or 70 is prevented by check valves 82 and 71, respectively. The maximum ratio change is achieved in the absence of fluid pressure from pump 18 and allows the operator to generate enough fluid pressure for steering the vehicle without power assist.

The description of this steering system in the context of a specific embodiment is for the purpose of explanation and not limitation. The privilege sought for this invention includes all variations and modifications within the spirit of the appended claims.

I claim:

1. A system for positioning a steerable element comprising:
   a motor driven pump;
   a reservoir;
   a bidirectional metering pump having an inlet and outlet;
   a servomotor assembly having first and second pairs of variable volume chambers for providing mechanical input to said steerable element with one chamber in each pair expanding when the other chamber in each pair contracts;
   a first valve having a neutral position blocking communication of said metering pump with said servomotor assembly and two operative positions communicating fluid pressure from said driven pump to the metering pump inlet, wherein the first operative position communicates fluid pressure from said metering pump to a first chamber in said first chamber pair and the second operative position communicates fluid pressure to a second chamber in said first chamber pair;
   a second valve having a neutral position blocking communication of fluid pressure from said driven pump to said servomotor assembly, a first operative position communicating fluid pressure from said driven pump to a first chamber of said second chamber pair, and a second operative position communicating fluid pressure from said driven pump to a second chamber of said second chamber pair;
   means for putting said first and second valves into said first operative positions and said second operative positions in response to fluid flow through said bidirectional pump in first and second directions, respectively;
   a third valve operable to reduce the communication of fluid pressure from said driven pump to the inlet of said second value; and
   means for operating said third valve in response to an operator controlled input.

2. The system of claim 1 wherein said third valve has a closed position for blocking communication of fluid pressure from said driven pump to said second valve.

3. The system of claim 1 wherein said system is used to steer a vehicle and said third valve operating means responds to at least one input selected from the group consisting of vehicle speed, steerable element position, and metering pump actuation rate.

4. The system of claim 1 wherein fluid pressure is communicated from the outlet of said metering pump to both first chambers in said chamber pairs and both second chambers in said chamber pairs when said first valve is in said first and second operative positions, respectively.

5. The system of claim 1 wherein said second valve, when in a neutral position, blocks fluid flow from at least one of said contracting chambers to said reservoir.

6. A vehicle steering system for positioning a steerable element, said system comprising:
   a motor driven pump;
   a reservoir;
   a manually driven bidirectional metering pump having a pair of ports, wihth one port serving as an inlet, while the other serves as an outlet;
   a servomotor assembly providing mechanical input to said steerable element and having a pair of hydraulic cylinders defining first and second pairs of expanding and contracting chambers;
   a first valve having a neutral position blocking communication of said metering pump with said servomotor assembly and two operative positions communicating fluid pressure from said driven pump to the metering pump inlet, wherein the first operative position communicates fluid pressure from said metering pump to a first chamber in sid first chamber pair and the second operative position communicates fluid pressure to a second chamber in said first chamber pair, said valve incluidng means for alternatly putting said first control valve into said first and second operative positions in response to the directional input to said metering pump;
   a first passage communicating fluid pressure from said driven pump to said first valve;
   a first passage communicating fluid pressure from said driven pump to said first valve;

a second and a third passage communicating said first valve with the first and second chambers, respectively, of said first chamber pair;

a second valve having a neutral position blocking communication of fluid pressure from said driven pump to said servomotor assembly and blocking fluid exhaust from both chambers of said second chamber pair, and having first and second operating positions, each operating position communicating different chambers in said second chamber pair with said driven pump and said reservoir, respectively, said second valve including means for putting said second valve into said first and second operating positions in response to a positive pressure differential between said second and third passages, and said third and second passages, respectively;

a fourth passage communicating fluid pressure from said first driven pump to said second valve;

a fifth passage communicating pressurized fluid from said first passage to said second valve;

a third valve positioned across said fifth passage for restricting flow therethrough in response to a signal;

and increasing fluid flow therethrough in response to increased fluid pressure in said fourth passage; and means for generating said signal in response to an operator controlled parameter.

7. The system of claim 6, wherein a sixth passage communicates the chamber in said first pair with the chamber in said second pair having the same volume variation sense and means are provided for blocking fluid flow from the second chamber pair to the first chamber pair across said sixth passage.

8. The system of claim 6 wherein said signal generation means includes a solenoid actuated valve for controlling a fluid pressure signal to said third valve and which acts in response to the turning angle of said steerable element.

9. The system of claim 6, wherein:
a flow restrictor is positioned across said fourth passage;
a first check valve is positioned across said fourth passage to prevent fluid flow from said second valve;
a second check valve is positioned across said fifth passage between said second valve and third valve to prevent fluid flow from said second valve; and
means are provided for progressively urging said third valve toward a closed position in proportional response to fluid pressure in said fifth passage between said third valve and second check valve, and for progressively urging said third valve toward an open position in proportional response to fluid pressure in said fourth passage between the restrictor and said first check valve.

* * * * *

UNITED STATES PATENT AND TRADEMARK OFFICE
CERTIFICATE OF CORRECTION

PATENT NO. : 4,723,475

DATED : 9 February 1988

INVENTOR(S) : Ronnie Franklin Burk

It is certified that error appears in the above-identified patent and that said Letters Patent is hereby corrected as shown below:

Col. 8, line 20, change "value" to -- valve --;
      line 24, change "blacking" to -- blocking --;
      line 57, change "sid" to -- said --;
      line 60, change "incluidng" to -- including --;
      line 61, change "alternatly" to -- alternately --;
and
      line 66 and 67, delete the entire lines beginning with "a first passage....to said first valve;"

Col. 10, line 22, change "propori-" to -- propor- --.

Signed and Sealed this

Thirteenth Day of December, 1988

*Attest:*

DONALD J. QUIGG

*Attesting Officer*      *Commissioner of Patents and Trademarks*